ns patent [19] [11] 3,832,461
Tumlinson, III et al. [45] Aug. 27, 1974

[54] METHOD FOR DISRUPTING PHEROMONE COMMUNICATION WITH CIS-7-DODECENI-1-OL

[75] Inventors: James H. Tumlinson, III; Everett R. Mitchell; Stella M. Browner; Marion S. Mayer, all of Gainesville, Fla.; Nathan Green, Silver Spring, Md.; Ronald W. Hines, Alachua, Fla.; Donald A. Lindquist, Vienna, Austria

[73] Assignee: The United States of America as represented by the Secretary of Agriculture, Washington, D.C.

[22] Filed: Mar. 15, 1972

[21] Appl. No.: 235,029

[52] U.S. Cl. .................................. 424/84, 424/343
[51] Int. Cl. ............................................ A01n 17/14
[58] Field of Search ............................... 424/84, 343

[56] References Cited
OTHER PUBLICATIONS

Chemical Abstracts, Vol. 74 (1971), p. 73438m
Shorey et al., J. Econ. Ent.; 60 (1967), p. 1541–1545.

*Primary Examiner*—Vincent D. Turner
*Attorney, Agent, or Firm*—M. Howard Silverstein

[57] ABSTRACT

A method for controlling the mating behavior of the cabbage looper which method consists of disrupting pheromone communication with a specific inhibitor.

1 Claim, No Drawings

METHOD FOR DISRUPTING PHEROMONE COMMUNICATION WITH CIS-7-DODECEN-1-OL

A non-exclusive, irrevocable, royalty-free license in the invention herein described, throughout the world for all purposes of the United States Government, with the power to grant sublicenses for such purposes, is hereby granted to the Government of the United States of America.

This invention relates to a compound cis-7-dodecen-1-ol and the use thereof particularly as a specific inhibitor for controlling the mating behavior of the cabbage looper by functioning to disrupt pheromone communication.

The sex pheromone produced by the female cabbage looper, Trichoplusia ni (Hubner) has been isolated, identified as cis-7-dodecen-1-ol acetate, and synthesized by others. It has also been reported that cis-7-dodecen-1-ol, as obtained by saponification of the pheromone, is inactive as a pheromone in laboratory bioassays. The trans isomer and several analogs of the pheromone have been synthesized and tested for stimulatory, attractive, and/or inhibitory properties with the male cabbage looper but none of the compounds tested have shown appreciable biological activity with the cabbage looper. Cis-7-dodecen-1-ol had never been tested as a pheromone inhibitor, to our knowledge, prior to our discovery of its inhibitory character.

Variation in the attractiveness of different batches of the commercially available synthetic pheromone in laboratory assays had however been reported and we have observed routinely that different batches of pheromone had varying degrees of attractiveness in field bioassays.

We discovered, quite unexpectedly, during an attempt to improve the attractiveness of a particular batch of pheromone via high vacuum distillation that certain of the distillation cuts contained a potent inhibiting material.

The inhibitor was isolated by gas chromatography and identified by mass spectral analysis and by means of infrared spectra obtained with the isolated inhibitor and a sample of pure, synthesized cis-7-dodecen-1-ol.

As set forth above, cis-7-dodecen-1-ol, the alcohol moiety of the pheromone ester cis-7-dodecen-1-ol acetate is known. The remarkably potent inhibitory character of the alcohol moiety relative the pheromone ester was not known until out quite fortuitous discovery of this property and our subsequent purpose to utilize this unique property in a method for disrupting pheromone communication.

During an attempt to improve the attractiveness of a particular batch of pheromone, a portion was distilled at high vacuum through an unpacked column about 20 cm tall. Three fractions, K2, K3, and K4, boiling between 86° and 89° C (0.032 mm) were collected. The small residue was discarded.

The parent batch and the three fractions K2, K3, and K4, together with a normally active batch designated as H were bioassayed in the laboratory at the concentrations shown in Table I. The two batches, H and K, of cis-7-dodecen-1-ol acetate used were obtained commercially. Batch H was consistently very attractive to male cabbage loopers while batch K gave very poor results.

TABLE I

Comparison of attractancy of batches H, K, and distillate fractions K2, Kc, K4 of the cabbage looper pheromone to 3-day old males in a tunnel olfactometer.

| Amount of pheromone in 0.5 ml of acetone | Average percentage attracted[1] | | | | |
|---|---|---|---|---|---|
| | H | K | K2 | K3 | K4 |
| 0.01 mg | 42 | 37 | 29 | 39 | 34 |
| 1.0 mg | 55 | 45 | 28 | 49 | 60 |

[1]Three replicates of 25 males each.

These fractions were analyzed gas chromatographically on columns 1 and 2 which columns are described below.

The inhibiting compound was isolated from fraction K2 by gas chromatography. The distillate was chromatographed successfully on the following columns: (1) SE-30, 5 percent on 80/100 mesh Chromosorb G, 4 m x 4 mm (ID), 190°, 60 cc/min He; (2) DEGS, 5 percent on 80/100 mesh mesh Chromosorb G, 4 m x 4 mm, 160°, 60 cc/min He; (3) DEGS, 5 percent on 80/100 mesh Chromosorb g, 7.3 m x 2 mm, 180°, 20 cc/min He. Fractions collected from each column were bioassayed in a tunnel olfactometer and the active fraction was then chromatographed on the succeeding column. Additionally, the purity of the inhibiting compound was checked by gas chromatography on the following columns: (4) OV25, 5 percent on 80/100 mesh Chromosorb G, 2 m x 2 mm, 180°, 20 cc/mm He; (5) Carbowax 20 M, 5 percent on 80/100 mesh Chromosorb G, 2 m x 2 mm, 160°, 20 cc/min He; (6) QF-1, 5 percent on 80/100 mesh Chromosorb G, 2 m x 2 mm, 160°, 20 cc/min He. The inhibiting compound used in laboratory assays and spectral structure elucidation was greater than 99 percent pure.

Mass spectral analysis was performed on a Finnigan Model 1015 gas chromatograph/quadrupole mass spectrometer system. Mass spectra were obtained with this instrument on both the inhibitor and the pheromone.

Infrared spectra were obtained with 25 $\mu g$ of isolated inhibitor and 50 $\mu g$ of 99.7 percent pure synthesized cis-7-dodecen-1-ol dissolved in 10 $\mu l$ of carbon tetrachloride in NaCl micro cavity cells. The cavity cells were positioned in a Barnes Engineering Model 128 beam condenser in the sample beam of a Perkin-Elmer Model 237 infrared spectrophotometer. Microozonolysis on 20 $\mu g$ each of the inhibitor and the pheromone was conducted at −78° C in 100 $\mu l$ of n-Hexane (certified 99 mole percent pure, Fisher Scientific) followed by treatment with triphenylphosphine. The ozonolysis products were analyzed by gas chromatography on column 5.

Cis-7-dodecen-1-ol was synthesized by refluxing 40 g of redistilled cis-7-dodecen-1-ol acetate for 3 hours with a solution of 11 g of NaOH in 25 ml of water and 75 ml of ethanol. After distilling off most of the ethanol the residue was extracted 3 times with small portions of ethyl ether. The combined extracts were washed in turn with water and brine and then distilled, bp 88°–90° (0.36 mm), $n_D^{25}$ 1.4532. The trans alcohol which amounted to 3–5 percent of the distilled product, determined by gas chromatography, was separated from the cis alcohol by liquid column chromatography on a 1.1 cm (ID) column packed to a height of 35 cm with a pentane slurry of 100/140 mesh silver nitrate (25 percent) treated silica gel (Adsorbosil CABN, Applied Science Laboratories). The column was loaded with 0.5 ml of the synthetic product and eluted successively with 200 ml of pentane-ether (95:5), 100 ml of pentane-ether (90:10), 100 ml pentane-ether (80:20), and 50 ml each of pentane-ether (70:30), pentane-ether (50:50), and ether. All fractions were gas chromatographed on column 3 to determine content. The alcohols were eluted in the pentane-ether (80:20), (70:30) and (50:50) fractions. The (80:20) fraction was enriched with the trans alcohol and the (70:30) and (50:50) fractions contained 99.3–100 percent cis alcohol. The cis alcohol was then further purified by gas chromatography on columns 1 and 2.

The very poor biological activity of the parent batch designated as batch K of the cabbage looper pheromone, cis-7-dodecen-1-ol acetate, is demonstrated by the small numbers of males captured in field traps relative to the numbers captured with batch H which was normally active batch:

| Pheromone batch (50 mg/trap) | Average number males/trap night |
|---|---|
| H | 27.8 |
| K | 1.0 |

However, gas chromatographic analysis on columns 1, 2, and 3 indicated that both batches contained about 89% cis-7-dodecen-1-ol acetate, 6 percent trans-7-dodecen-1-ol acetate, and 5 percent unknown impurities. Since both batches contained almost equal amounts of the trans isomer and a previous report indicated that the trans isomer masked or inhibited the perhomone only when it was present in 5–10 times greater amounts than the cis isomer, it seemd most unlikely this was responsible for the low activity of batch K. Gas chromatographic analysis of batch K and distillate fractions K2, K3, and K4 showed an impurity with a retention time, relative to cis-7-dodecen-1-ol acetate, of 0.53 on SE-30 and 1.23 on diethylene glycol succinate. This impurity amounted to 5 percent of the pheromone in batch K and 10 percent, 6 percent, and 3 percent in fractions K2, K3, and K4 respectively. The biological activity of these fractions increased with the decrease in the amount of this impurity (Table I). Batch H, which was consistently very attractive to cabbage looper males, contains less than 0.05 percent of this impurity as determined by gas chromatographic analysis.

The inhibiting impurity was isolated from batch K and purified as described earlier. Mass spectral analysis of the pheromone and the inhibitor produced nearly identical spectra. The parent peak was absent in both spectra. Both spectra had a peak at m/e, 166, which resulted from loss of $H_2O$ from the alcohol and $CH_3COOH$ from the acetate. A distinguishing characteristic was the appearance of a peak at m/e, 61 ($CH_3COOH_2^+$) in the pheromone spectrum and its absence in the inhibitor spectrum. Conversely a peak at m/e, 31, in the inhibitor spectrum, which is good evidence for a primary alcohol, was absent in the pheromone spectrum. The infrared spectrum was consistent with that expected for a cis alcohol, with a sharp band at 3,630 cm$^{-1}$ (free OH), and the absence of the typical strong trans bands in the 980–965 cm$^{-1}$ region.

Microozonolysis of the inhibitor and the pheromone yielded the $C_5$-aldehyde determined by identical gas chromatographic retention time with a known sample of valeraldehyde. Thus the double bond is in position $C_7$ and the structure of the inhibitor is cis-7-dodecen-1-ol. This was confirmed by saponification of cis-7-dodecen-1-ol acetate, batch H. The cis alcohol which comprised 89 percent of the product was identical in gas chromatographic retention times on columns 1, 2, and 3 and in biological activity to the inhibitor obtained from batch K.

Laboratory assays were conducted in a tunnel olfactometer made of Plexiglass. The pheromone and other test chemicals were dispensed inside the olfactometer from a glass tube. Known quantities of the test compounds dispersed in 0.5 ml of acetone were coated on the inside of those tubes. The acetone was evaporated before the tubes were placed in the olfactometer by flowing charcoal-filtered air through the treated tube at about 50 ml/min. 25 laboratory reared males (3 days old) were used in each test. None of the males were used for more than one test. Each step in the isolation of the inhibitor was monitored by this assay.

Batches H and K of the pheromone were evaluated for attractiveness to male cabbage loopers in the field. Double c cone can traps were baited with polyethylene vials containing 50 mg of the synthetic material. The traps were spaced ca. 0.2 mile apart along the margins of cabbage fields. Each treatment was replicated three times each night for four consecutive nights beginning March 29. Moths were collected and traps plus treatments were rotated daily among permanent trapping stations.

Field tests with the pure synthesized inhibitor (see later) were conducted as follows. The pheromone (batch H) and inhibitor were formulated in benzene individually and in combination. The benzene solutions were dispensed from 13 x 100 mm test tubes fitted with a cotton dental-roll wick. About 2.5–3 ml of the benzene solution evaporated from each dispenser during a night depending upon weather conditions. In one test, dispensers containing pheromone alone, pheromone plus inhibitor, and inhibitor alone were placed in the center of can traps opposite the holes in the entrance cones. Concentrations tested are given in Table II. The traps were suspended on wooden poles about 1 m above the ground and spaced ca. 0.1 mile apart along the margins of cotton fields. The treatments were placed in position just before sunset and collected the following morning ca. sunrise to reduce excessive loss of material due to evaporation during the day.

In a second test, wick dispensers containing 5 ml of benzene plus inhibitor (Table III) were placed beside a screenwire cage (6 x 4 in.) containing 50 virgin female cabbage loopers which was suspended in the center of a trap. A similar dispenser containing only benzene with 50 virgin females served as the control. Two replicates of each treatment were run the first night and 3 the following night. Treatments were rotated among trapping stations to minimize position effects.

TABLE II

Capture of male cabbage loopers in field traps baited with benzene solutions of synthetic sex pheromone and inhibitor

| Pheromone (mg/ml) | Inhibitor (mg.ml) | Avg. no. moths/trap per night[1] | |
|---|---|---|---|
| 1 | 0 | 9.0 | a |
| 1 | 1 | 0 | b |
| 1 | 0.1 | 0.3 | b |

TABLE II-Continued

Capture of male cabbage loopers in field traps baited with benzene solutions of synthetic sex pheromone and inhibitor

| Pheromone (mg/ml) | Inhibitor (mg.ml) | Avg. no. moths/trap per night[1] | |
|---|---|---|---|
| 1 | .01 | 0.2 | b |
| 1 | .001 | 2.5 | c |
| 1 | .0001 | 6.7 | a |

[1] Average of 6 trap nights. Numbers followed by different letters differ significantly at the 5% level.

TABLE III

Capture of male cabbage loopers in the field with electric grid traps baited with 50 virgin females and inhibitor

| Bait[1] | Replicate | Number males captured | | | | | Total |
|---|---|---|---|---|---|---|---|
| | | 1 | 2 | 3 | 4 | 5 | |
| 50 females + 5 ml benzene | | 116 | 92 | 70 | 84 | 110 | 472 |
| 50 females + 5 mg inhibitor/ 5 ml benzene | | 5 | 7 | 3 | 4 | 1 | 20 |

Females were 2–3 days old. About 2.5 to 3.0 ml of benzene solution evaporated from each dispenser during a night.

TABLE IV

Response of 3-day old male cabbage loopers to pheromone (batch H) and inhibitor mixtures in a tunnel olfactometer

| | Amount of pheromone in 0.5 ml acetone ($\mu$g) | Amount of inhibitor ($\mu$G) | No. of tests | Average response T/S[1] |
|---|---|---|---|---|
| Standard pheromone | 0.1 | 0 | 8 | 1.0 |
| Acetone blank | 0 | 0 | 10 | 0.39 |
| Pheromone + inhibitor | .1 | 0.001 | 3 | .95 |
| | .1 | .01 | 3 | .60 |
| | .1 | .1 | 3 | .29 |

[1] T/S = % response to test/% response to pheromone standard

The results of laboratory and field tests in which batch H of the pheromone was combined with varying amounts of 99.3 percent pure cis-7-dodecen-1-ol were shown in Tables II and IV. There was accordingly no doubt that the alcohol was a potent inhibitor since as little as 0.1 percent of the alcohol added to the pheromone decreased the attractiveness of the pheromone significantly in the field. Additionally, as little as 3 mg per night reduced the attractiveness of 50 live females by 95 percent (Table III).

Clearly the alcohol inhibits the response of the male cabbage loopers to the pheromone produced by the females.

The art of pheromone exploitation although relatively new already possesses a well developed technology. For example, in the specific area with which the subject of this invention is concerned it is known that the lower threshold for male behavioral responses to the cabbage looper female sex pheromone is about $2 \times 10^{-14}$ grams per liter of air.

Some conception of the order of magnitude involved in this effective concentration is obtained when pheromone concentration is expressed as about 60 molecules of the compound per cubic millimeter of air. As incredibly small as is this effective concentration of pheromone, observe from the tables herein incorporated (particularly Table II and Table IV) that the effective concentration of the inhibitor that is the subject of this invention is less than one-tenth to less than one-one hundredeth that of the pheromone. The attractive possibilities for controlling the cabbage looper population via pheromone inhibition are immediately apparent from a consideration of the above cited values.

Shorey et al. (Journal of Economic Entomology 60, 1541–5, December 1967) have estimated that in still air the mating behavior control of cabbage loopers by preconditioning with the female sex pheromone (i.e., the "male confusion" technique) requires the expenditure of approximately 0.2 grams of the pheromone per acre. Applicants inhibitor technique can provide a practical control of mating behavior with one hundredeth this amount under the same conditions.

As will be recognized by those skilled in the art of pheromone technology, varying field conditions of temperature and wind velocity can alter the requisite amount of material. It is, however, clear that exceedingly minute amounts of the inhibitor that is the subject of this invention suffice to control the mating behavior of the male cabbage looper.

As will be recognized by those skilled in the art of pheromone technology, detailed information concerning the mating behavior of the cabbage looper such as the time of day, the optimum range of temperature at which the female cabbage looper emits the sex pheromone is essential to the success of any deceptively simple method of mating inhibition such as the one herein proposed.

The mating season for the cabbage looper is of course well known within limits but by reason of annual seasonal variations not to mention locational variations, it becomes necessary to establish precise times for mating by "on the spot" determinations for particular locations and particular seasons. Armed with the essential mating behavior information, atmospheric conditions and the like for a particular location, the method of inhibiting male sexual activity by disruption of pheromone communication involves simply the area wide dispersel over the selected location of effective concentrations of the inhibitor.

For example, imminency of the cabbage looper mating season having been established for a particular locality, wicking carrying the volatile inhibitor can be set out at appropriately spaced intervals along the windward side of the field to be treated with the inhibitor. If a prevailing wind current does not happen to be extant at the critical time, the inhibitor carrying wickings can be dispersed appropriately across the area and maintained throughout the mating interval.

It is known, for example, that the mating of the cabbage looper generally takes place between the seventh and the twelfth hours of the dark period of the day and at temperatures of about 20°–30° C. As an alternative to distribution of the inhibitor via volatilization from wicking or small vials spaced throughout the area to be treated at about 10 meter intervals, we contemplate the inhibitor applied to a carrier (bits of paper and bits of cork are particularly good for this purpose) and scattered over the area to be treated via aircraft.

Still another method for dispersing the inhibitor is to apply the inhibitor material to the abdomen area of live but sterile female cabbage loopers and release the so-treated insects in the area to be treated.

In is recognized, of course, that complete prevention of mating by an inhibitor technique is not possible. It is evident however that significant population reductions are possible and that this technique used in combination with other suppressive measures can contribute toward control and toward the ultimate eradication of the cabbage looper.

Having thus described our invention, we claim::

1. A method for inhibiting the mating behavior of the male cabbage looper which consists of treating, at mating time, an area infested with both male and female cabbage loopers with an effective amount of the femal pheromone inhibitor cis-7-dodecen-1-ol.

* * * * *